United States Patent
Lenzen, Jr. et al.

(10) Patent No.: US 6,896,281 B2
(45) Date of Patent: May 24, 2005

(54) DETACHABLE TOW HOOK ASSEMBLY

(75) Inventors: Richard A Lenzen, Jr., White Lake Township, MI (US); Sreedharan Venkataratnam, Troy, MI (US); Forest Nine, Bloomfield Hills, MI (US); Philip Kass, Taylor, MI (US); Mark D Shafto, Commerce, MI (US); Heinz Hentschel, Canton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 85 days.

(21) Appl. No.: 10/290,896

(22) Filed: Nov. 8, 2002

(65) Prior Publication Data

US 2004/0090041 A1 May 13, 2004

(51) Int. Cl.⁷ .............................................. B60D 1/04
(52) U.S. Cl. ...................................... 280/495; 280/504
(58) Field of Search ................................ 280/495, 500,
280/501, 449, 450, 451, 460.1, 504, 514,
762, 491.5, 507, 457; 276/204, 203.01;
180/274; 293/132, 142, 117

(56) References Cited

U.S. PATENT DOCUMENTS

| | | | | |
|---|---|---|---|---|
| 1,430,922 A | * | 10/1922 | Mueller | ......................... 280/450 |
| 2,444,876 A | * | 7/1948 | Kuhl | .......................... 280/495 |
| 2,592,217 A | * | 4/1952 | Weber | .......................... 280/501 |
| 3,843,162 A | * | 10/1974 | Abromavage et al. | ....... 280/486 |
| 3,929,354 A | * | 12/1975 | Elkins | ...................... 280/490.1 |
| 5,054,806 A | | 10/1991 | Chester | |
| 5,112,113 A | | 5/1992 | Wagner et al. | |
| 6,802,522 B1 | * | 10/2004 | Park et al. | ................... 280/495 |
| 2002/0105163 A1 | * | 8/2002 | Pierman et al. | .............. 280/504 |

FOREIGN PATENT DOCUMENTS

| | | | |
|---|---|---|---|
| JP | 9-277811 | * | 10/1997 |
| JP | 2000-296742 | * | 10/2000 |
| JP | 2001-180240 | * | 7/2001 |
| JP | 2002-53066 | * | 2/2002 |
| JP | 2002-053065 | * | 2/2002 |
| JP | 2003-2136 | * | 1/2003 |

* cited by examiner

*Primary Examiner*—Anne Marie Boehler
(74) *Attorney, Agent, or Firm*—Ralph E. Smith

(57) ABSTRACT

A tow hook mount is adapted to resist movement of the tow hook in a towing direction. The mount is also adapted to release the tow hook by allowing the tow hook to move in a direction opposite to the towing direction when contacted by a force in such direction. The tow hook is an elongated member having a towing end and a mounting end. The mounting end includes a front mount and a rear mount, each having a slot extending substantially opposite to the towing direction. In a low impact collision, the tow hook is arranged to move or break away from the automobile upon application of an impact force to the tow hook which is less than an activation force required to activate an airbag on the vehicle.

3 Claims, 2 Drawing Sheets

DETACHABLE TOW HOOK ASSEMBLY

FIELD OF THE INVENTION

The present invention relates to tow hooks for automotive vehicles.

BACKGROUND OF THE INVENTION

Automobiles are commonly provided with tow hooks for use in towing when the automobile is disabled. In order to enable towing of the automobile, the tow hook is typically rigidly affixed to the automobile to support the forces generated during towing. In addition, it has been typical to locate the tow hooks very close to, and in some cases extending slightly past, the front fascia of the automobile to facilitate access to and use of the tow hooks.

Automobiles are also commonly provided with airbag systems which act as supplemental passenger restraints during an accident. The airbag systems include an activation sensor which is generally designed to deploy the airbag only when the impact of an accident is significant enough to warrant the supplemental restraint. Thus, it is desirable that the airbag not deploy during low speed impact events.

Due to the location and nature of such prior art tow hooks, an automobile provided with both an airbag system and tow hooks has often required adjustment of the airbag system to accommodate the effect of the tow hook(s) to meet desired airbag deployment requirements during low speed impact events. This can be particularly problematic where the tow hooks are provided as an optional feature selected by the purchaser. Consequently, it is desirable to provide tow hooks on an automobile that will perform their intended towing function, but will not affect the operation of the airbag system.

SUMMARY OF THE INVENTION

In accordance with a first aspect of the present invention, a tow hook assembly for an automobile is provided. The assembly includes a tow hook and a mount adapted to resist movement of the tow hook in a towing direction. The mount is adapted to release the tow hook by allowing the tow hook to move in a direction substantially opposite to the towing direction when the tow hook is contacted by a force in a direction substantially opposite to the towing direction.

In accordance with another aspect of the present invention, the tow hook assembly includes an elongated member having a tow end providing a towing surface and having a mounting end. A front mount and a rear mount each have a slot extending in a direction which is substantially opposite to the towing direction. A bolt extends through at least one of the slots and attaches to the tow hook.

In accordance with yet another aspect of the present invention, an automobile with an airbag system is provided. The automobile includes a tow hook attached to the automobile such that that the automobile may be towed by the tow hook and such that the tow hook will break away from the automobile upon application of an impact force which is less than the activation force required to activate the airbag.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
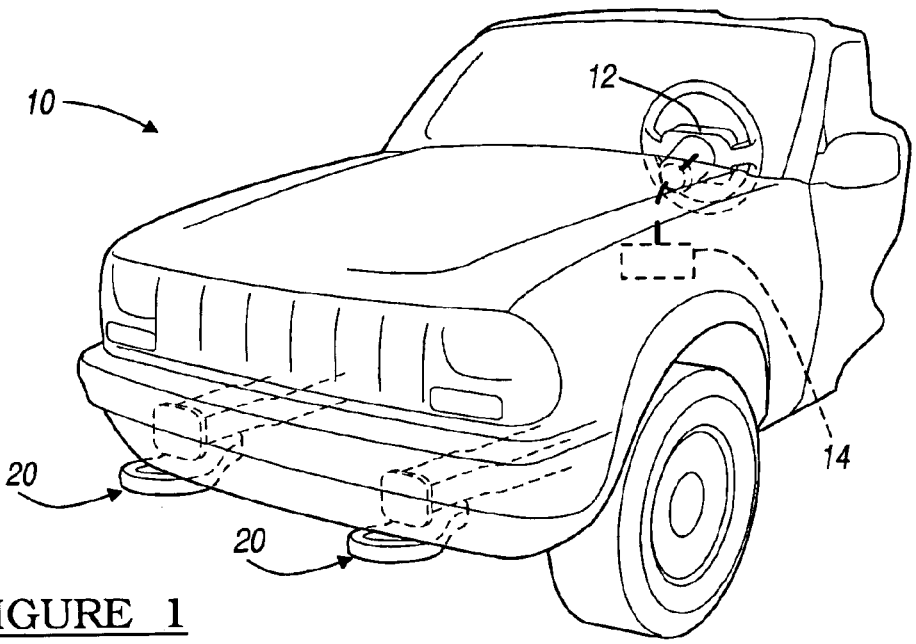
FIG. 1 is a partial view of an automobile in accordance with one aspect of the present invention including an airbag sensor and tow hooks of a preferred embodiment.

Referring to FIG. 1, an automobile 10 is illustrated which has an airbag 12 system including an airbag activation sensor 14. A preferred embodiment of two break away tow hook assemblies, indicated generally as 20, are also equipped on the automobile. As described below, each tow hook assembly 20 includes an elongated tow hook member 22 attached to the automobile 10 such that the automobile 10 may be towed by the tow hook member 22 and such that the tow hook member 22 will break away from the automobile 10 upon application of a force which is less than a force required to activate the airbag 12.

Figure 2:
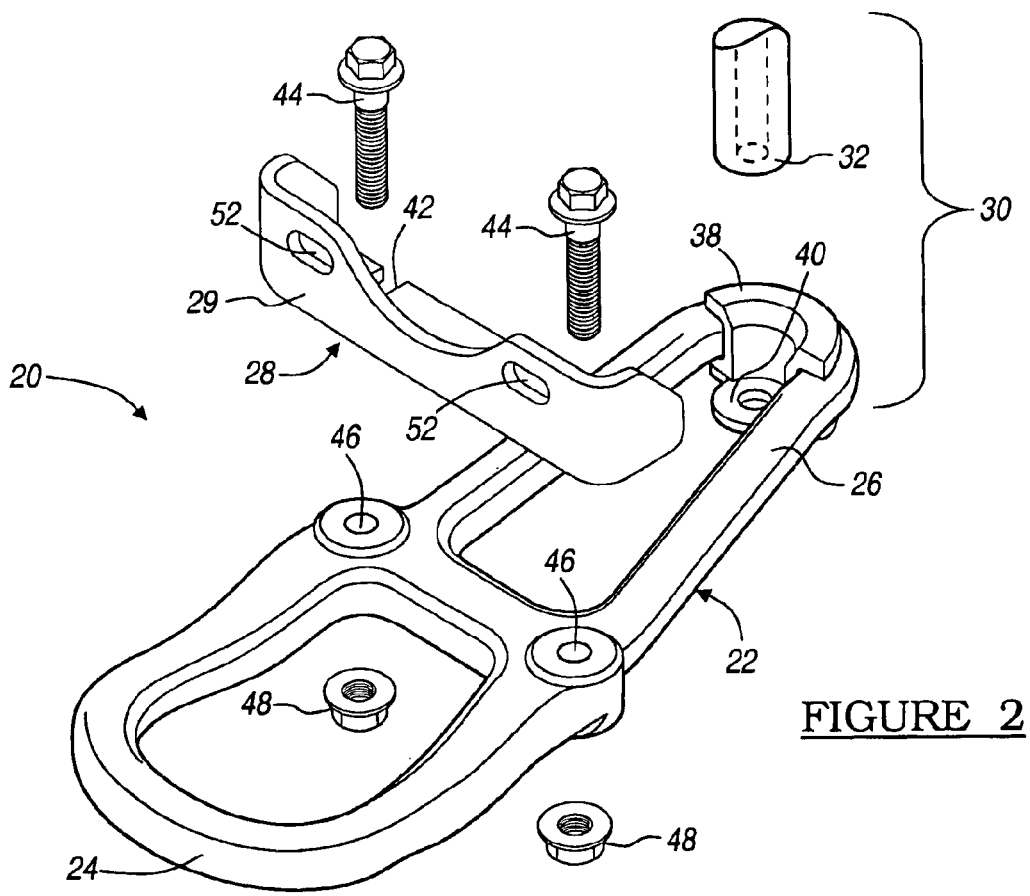
FIG. 2 is an enlarged expanded perspective view of the preferred tow hook assembly of FIG. 1.

Referring to FIG. 2, an expanded view of the preferred tow hook assembly 20 of FIG. 1, including its mounting components, is provided. Generally, the tow hook assembly 20 includes an elongated member 22 cast of nodular iron. The front end of the tow hook member 22 is the towing end 24. The towing end 24 is adapted to be engaged by a tow rope or tow rod so that the automobile 10 may be towed thereby, and has a generally semi-circular shape. The rear end 26 of the tow hook member 22 is the mounting end and has a generally triangular shape. The mounting end 26 is adapted to be attached to the automobile 10 such that the automobile 10 may be towed by the tow hook member 22 and such that the tow hook member 22 will break away from the automobile 10 upon application of a force which is less than a force required to activate the airbag 12. The mounting end 26 is attached to a front mount 28 and a rear mount 30.

Figure 3:
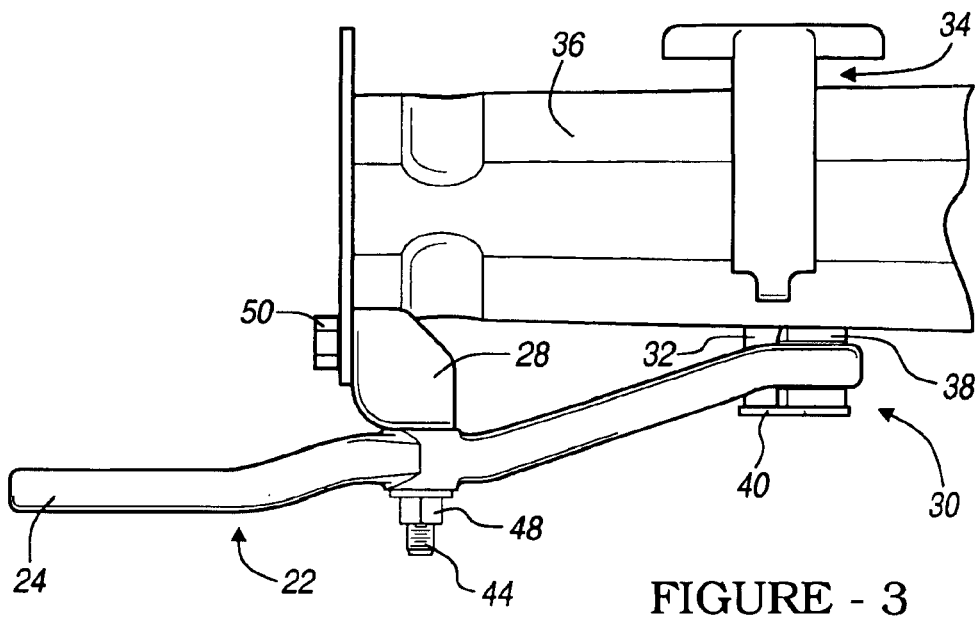
FIG. 3 is a side elevation view of the preferred tow hook assembly attached to the frame rail of the automobile.
Figure 4:
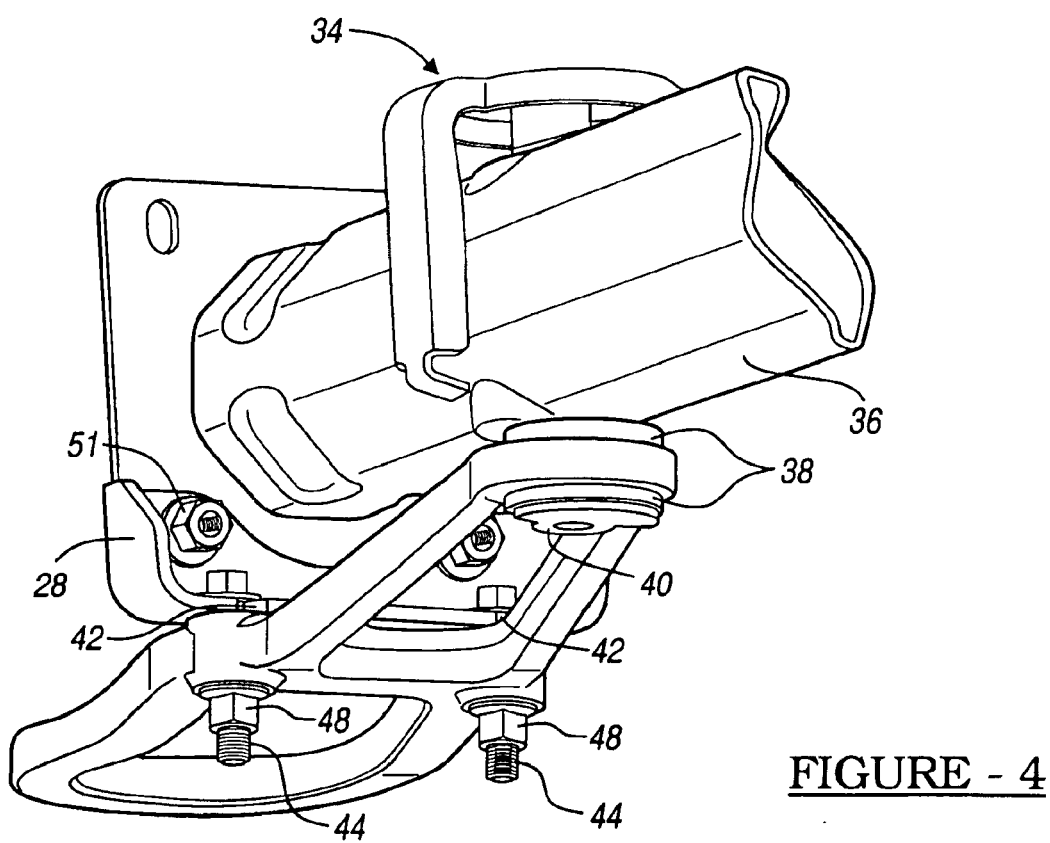
FIG. 4 is a perspective view of the tow hook assembly and frame rail of FIG. 3.

Referring to FIGS. 2, 3 and 4, the rear mount 30 incorporates a tube 32 which is part of a body attachment member 34. The tube 32 extends through the frame rail 36 and is welded in place at both the top and bottom of the frame rail 36. The rear mount 30 also includes an isolator 38 preferably made from an elastomeric material; and more preferably, from hard rubber or urethane. The isolator 38 is sandwiched between the tow hook member 22 and the frame rail 36, the tube 32 and an eccentric washer 40 of the rear mount 30. The space between the eccentric washer 40, the tube 32 and the frame rail 36 forms an open slot extending towards the rear of the automobile 10. A threaded bolt (not shown) extends through the tube 32 and is tightened to locate the eccentric washer 40 against the distal end of the tube 32 and slightly compress the sandwiched isolator 38.

The front mount 28 includes a bracket 29 made of stamped steel and having slots 42 adapted to receive bolts 44. The bolts 44 extend through apertures 46 in the mounting end 26 of the tow hook 22 to receive the nuts 48. Both the front bracket 28 and the tow hook 22 are electrically coated with a corrosion inhibitor which reduces the coefficient of friction of the surfaces of these components. Thus, the bolts 44 may be torqued significantly to firmly attach the tow hook 22 to the front mount 28. The front mount 28 is preferably attached to the tow hook 22 prior to attaching the tow hook 22 at the rear mount 30. In addition, when the rear mount bolt (not shown) compresses the isolation member 38, the compression is preferably sufficient to support the tow hook 22, including the front mount 28, prior to attaching the front mount 28 to the frame rail 36. The front mount 28 is attached to the frame rail 36 using threaded fasteners 50 which also mount the bumper (not shown) to the frame rail 36. Thus, the tow hook assembly 20 may be supported in place by the rear mount 30 (and the front mount 28 resting against its mounting surface of the frame rail 36) until the bumper is later mounted using threaded bolts 50 which also extend through apertures 52 in the front mount 28 and cooperate with nuts 51.

The tow hooks (one on each side) 22 are useful for towing the automobile 10. For example, a tow rope (not seen) is hooked on the towing end 24 of the tow hooks 22 or threaded through the front opening of the front towing end 24 of each tow hook and attached thereto. The tow rope is then used to tow the automobile 10 using a towing force in the forward direction. Both the front mount 28 and the rear mount 30 are adapted to cooperate to transmit this forward towing force to the frame rail 36. In addition, the rear mount 30 includes the isolation member 38 which helps isolate tow hook vibration from the frame rail 36 (during both towing and non-towing periods).

The front end 24 of the tow hook 22 is exposed beyond the front fascia of the automobile 10 in order to aid its use in towing. Thus, it is susceptible to being impacted during an impact with another object during a collision. A sufficient impact on the tow hook 22 in the rearward direction (generally opposite to the towing direction) will cause the tow hook 22 to move rearward with respect to the frame rail 36. This occurs as a result of the slots associated with each mount 28, 30. With the forward mount 28, the bolts 44 slide rearward in the front mount slots 42. With the rear mount 30, the rear end of the tow hook 26 slides back in the slot formed between the eccentric washer 40 and the frame rail 36. The force required to move the tow hook 22 backwards in the slots is less than the force required to activate the airbag 12. The force required to move the tow hook 22 rearward in the slots is preferably less than about 10,000 lbs. force; and more preferably, less than about 8,000 lbs. force. In addition, the force required to move the tow hook 22 rearward in the slots is less than about 50% of the force required to activate the airbag 12; more preferably, less than about 30%; and even more preferably, less than about 15%.

Further, the energy absorption contribution from the tow hook is preferably less than 50%; and more preferably less than about 3%. Of course, one skilled in the art may readily conceive of various modifications to the above described invention. For example, a bolt adapted to shear under a predetermined shear force may be used to attach the tow hook. In such a case, a cooperating member extending from the automobile could provide support to the mount and bolt, preventing the bolt from shearing, in the towing direction, but not provide any support in the opposite direction. Additionally, the mounting of the tow hook could readily be adapted to unibody applications.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tow hook assembly for an automobile comprising:
    a tow hook; and
        a mount comprising a front mount and a rear mount adapted to attach the assembly to the automobile and to resist movement of the tow hook in a towing direction, the mount being adapted to release the tow hook by allowing the tow hook to move in a direction substantially opposite to the towing direction when the tow hook is contacted by a force in a direction substantially opposite to the towing direction.

2. The tow hook assembly according to claim 1, wherein at least one of the front mount and the rear mount is adapted to attach to a frame rail of the automobile.

3. A tow hook for an automobile comprising:
    an elongated member having a tow end and a mounting end, the tow end providing a towing surface;
    a front mount and a rear mount, each of the mounts having a slot extending in a direction substantially opposite to a towing direction, wherein the rear mount is adapted to retain the tow hook in place on an automobile prior to attachment of the front mount to a cooperating automobile component; and
    a bolt extending through at least one of the slots and attaching to the elongated member.

* * * * *